(12) United States Patent
Enevoldsen et al.

(10) Patent No.: US 8,678,770 B2
(45) Date of Patent: Mar. 25, 2014

(54) OPTIMISED LAYOUT FOR WIND TURBINE ROTOR BLADES

(75) Inventors: Peder Bay Enevoldsen, Vejle (DK); Søren Hjort, Brande (DK); Jesper Laursen, Silkeborg (DK)

(73) Assignee: Siemens Aktiengesellschaft, Munich (DE)

( * ) Notice: Subject to any disclaimer, the term of this patent is extended or adjusted under 35 U.S.C. 154(b) by 1024 days.

(21) Appl. No.: 12/594,205

(22) PCT Filed: Apr. 1, 2008

(86) PCT No.: PCT/EP2008/053878
§ 371 (c)(1),
(2), (4) Date: Apr. 5, 2010

(87) PCT Pub. No.: WO2008/122545
PCT Pub. Date: Oct. 16, 2008

(65) Prior Publication Data
US 2010/0196166 A1 Aug. 5, 2010

(30) Foreign Application Priority Data
Apr. 4, 2007 (EP) .................. 07007128

(51) Int. Cl.
*F03D 1/06* (2006.01)
(52) U.S. Cl.
USPC ..................................... 416/223 R
(58) Field of Classification Search
USPC ............... 416/223 R, 243, DIG. 5
See application file for complete search history.

(56) References Cited

U.S. PATENT DOCUMENTS

| 2,591,757 | A | * | 4/1952 | Young | 416/95 |
| 5,474,425 | A | * | 12/1995 | Lawlor | 416/223 R |
| 5,879,131 | A | | 3/1999 | Arlton et al. | |
| 6,503,058 | B1 | * | 1/2003 | Selig et al. | 416/223 R |

FOREIGN PATENT DOCUMENTS

| DE | 4201425 A1 | 7/1993 |
| DE | 29602674 U1 | 4/1996 |
| FR | 575990 A | 8/1924 |
| JP | 2005282451 A | 10/2005 |

OTHER PUBLICATIONS

Bechly et al., "Structural Design of a Composite Wind Turbine Blade Using Finite Element Analysis"; Computers and Structures, 1997, pp. 639-646; vol. 63, No. 3, XP002448638; Elsevier Science Ltd, Great Britain.

(Continued)

*Primary Examiner* — Edward Look
*Assistant Examiner* — Liam McDowell

(57) ABSTRACT

A wind turbine rotor blade defined by a tip point, a shoulder, a maximum chord interval which is defined as the radial interval over which the blade chord is no less that 95% of the shoulder chord and which extends over at least 15% of the entire blade length, and an outer blade interval extending from the maximum chord interval to the tip point, wherein the outer blade interval has a concave hyperbolic chord distribution from the maximum chord interval towards the tip point. Further a method for optimizing the chord distribution of a wind turbine blade layout is provided, wherein the chord distribution is optimized by optimizing the chord distribution in the maximum chord interval by maximizing the ratio of the annual energy production to the loads acting on the blade and in the outer blade interval with respect to the annual energy production alone.

7 Claims, 2 Drawing Sheets

(56) References Cited

OTHER PUBLICATIONS

Hau, Windkraftanlagen; "5.5 Ausgeführte Rotorblattformen"; 1996; pp. 113-118; XP002448700; Springer, Berlin.
Hampsey, "Multiobjective Evolutionary Optimisation of Small Wind Turbine Blades", University of Newcastle, 2002, pp. 269-273 and 295-319; XP-002484089.
Multiobjective Evolutionaly Optimisation of Small Wind Turbine Blades, Mark Hampsey, B. E. "Multiobjective Evolutionaly Optimisation of Small Wind Turbine Blades", PhD tehsis, AU, University of Newcastle Aug. 2002, pp. 269, 271-273, 294-297, Remarks pp. 299, 301-305, 307-313, 315, 317-319.

* cited by examiner

OPTIMISED LAYOUT FOR WIND TURBINE ROTOR BLADES

CROSS REFERENCE TO RELATED APPLICATIONS

This application is the US National Stage of International Application No. PCT/EP2008/053878, filed Apr. 1, 2008 and claims the benefit thereof. The International Application claims the benefits of European application No. 07007128.7 filed Apr. 4, 2007, both of the applications are incorporated by reference herein in their entirety.

FIELD OF THE INVENTION

The present invention relates to a wind turbine rotor blade and to a method of optimising the chord distribution of a wind turbine rotor blade layout.

BACKGROUND OF THE INVENTION

For a description of a wind turbine blade layout the following definitions are applied. Tip point (4) means the maximum radial position of the blade, measured from the blade root (2). Radius (5) means the distance measured from the turbine blade root (2), by which the blade is connected to a rotor hub, along the centreline which connects the blade root (2) with the tip point (4). Chord (6) means the maximum width of the turbine blade perpendicular to the centreline (16). Shoulder (3) means the radial position, measured from the blade root (2), where the chord distribution has its peak value. Maximum chord interval (7) means the radial interval over which the blade chord (6) is no less than 95% of the shoulder chord. Outer blade interval (8) means the radial interval located between the shoulder and the tip point over which the blade chord (6) is less than 95% of the shoulder chord. Root interval (17) means the radial interval located between the blade root (2) and the shoulder over which the blade chord (6) is less than 95% of the shoulder chord. For further illustration of the mentioned terms see also FIG. 1.

The layout of a wind turbine rotor blade is a result of a multidimensional and multi-functional process, where factors such as the annual energy production (AEP) of the wind turbine, the operational loads, the manufacturing process, the choice of materials, and secondary issues such as transport considerations are elements that all influence the final selection of optimum layout.

The common practice for wind turbine blade layout, in particular the chord distributions, is based mainly on rules of thumb or in some cases more complex optimisations based on maximising the annual energy production.

The document FR 575.990 discloses at page 2 in line 4 to 23 and in FIG. 2 an improved wind turbine blade, which is based on an originally rectangular shaped wind turbine blade. The improved wind turbine blade comprises a nearly rectangular shaped outer blade interval and an also nearly rectangular shaped maximum chord interval.

The paper "Structural design of a composite wind turbine blade using finite element analysis" by M. E. Bechly and P. D. Clausen, COMPUTER & STRUCTURES, vol. 63, no. 3, pages 639-646 describes preliminary work to optimise the use of material in a 2.5 m long fibreglass composite wind turbine blade. The radial variation of the blade chord and twist were determined using conventional blade element theory and the relative radial stacking arrangement of these blade elements to form the final shape were obtained from an extensive trial-and-error finite element analysis done to minimise stress levels in a previous blade with a similar profile.

A classical annual energy production optimised chord distribution is shown in FIG. 2. The scale of the chord direction in FIG. 2 is enlarged as compared to the scale of the radial direction. The chord distribution is characterised by a sharp peak of the chord (6) at the shoulder (3) and a concave chord distribution from the shoulder (3) to the tip point (4). The part between the blade root (2) and the shoulder (3) does not contribute notably to the annual energy production, and it is merely a structural carrier of loads between the annual energy producing part of the blade and the blade root.

For practical reasons an annual energy production optimised chord distribution is normally not applied directly, since the shoulder chord becomes too large for convenient manufacturing, transportation and handling. Consequently, chord distributions in common use today tend to be modifications of annual energy production optimised layout, as depicted in FIG. 3. The dashed outer blade chord distribution (10) is a simple downscaling of an annual energy production optimised chord distribution, with moderately reduced output. The full line (11) and dash-dot line (12) outer blade chord distribution have been modified by e.g. manufacturing or structural considerations.

SUMMARY OF THE INVENTION

It is therefore an objective of the present invention to provide an improved wind turbine rotor blade. It is a further objective to provide an improved method for optimising the chord distribution of a wind turbine rotor blade.

These objectives are solved by a wind turbine rotor blade and by a method as claimed in the dependant claims. The depending claims define further developments of the invention.

The inventive wind turbine rotor blade is a result of the inventive method for optimising the chord distribution of a wind turbine rotor blade. Normally the blade optimisations will seek to maximise the annual energy production. Here, an annual energy production constraint and a maximum allowable chord have been imposed. Hence, in the inventive method the ratio of the annual energy production to the loads is maximised. The method for optimising the chord distribution of a wind turbine rotor blade is characterised in that the chord distribution is optimised with respect to the ratio of the annual energy production to the loads acting on the blade rather than with respect to annual energy production alone. This may be, e.g. achieved by optimising the chord distribution with respect to the ratio of annual energy production to the loads in the maximum chord interval while optimising it with respect to the annual energy production in the outer blade interval. The maximum chord interval, in which an optimisation with respect to the ratio of the annual energy production to the load is done, can extend over at least 15% of the entire blade length and the outer blade interval, in which an optimisation with respect to the annual energy production alone is done, can extend for at least 50% to maximal 80% of the entire blade length.

The result is a wind turbine rotor blade having two distinct chord distribution features, namely a rather broad maximum chord interval which extends over at least 15% of the entire blade length and an outer blade interval that can, e.g. have a concave hyperbolic chord distribution from the shoulder towards the tip point, representing an annual energy production optimised curving. Moreover, the outer blade interval can extend over at least 50% to maximal 80% of the entire blade length. An exemplary chord distribution can have a maximum chord interval which extends over 20% of the entire blade length and an outer blade interval which extends over 70% of the entire blade length. In this case the root interval covers 10% of the entire blade length.

In contrast to the inventive wind turbine blade a general trait of all state of the art chord distributions used in the wind turbine rotor blade industry today is the rather pointed shape of chord distribution in the vicinity of the shoulder, i.e. a rather narrow maximum chord interval. But the commonly used chord distributions do not reach an optimum annual energy production.

By the present invention an increase in the ratio of annual energy production per structural loading of the blade of up to 10% relative to conventional wind turbine layouts becomes possible.

This is achieved in particular by a combination of a purely annual energy production optimised part of the chord distribution, namely the outer chord interval, with a part of the chord distribution that represents an optimum between annual energy production performance and loads, namely the maximum chord interval. Now, the layout is not bound by traditional considerations of a well defined shoulder where the chord is 95% maximum chord or more for only a very limited radius range.

The inventive turbine chord distribution overcomes the prejudice, that turbine blades should have a pointed shape of the chord distribution in the vicinity of the shoulder.

BRIEF DESCRIPTION OF THE DRAWINGS

Further features, properties and advantages of the present invention will become clear from the following description of embodiments in conjunction with the accompanying drawings.

The scale of the chord direction in all FIGS. 1 to 6 is enlarged as compared to the scale of the radial direction to make the chord distribution more noticeable in the figures.

DETAILED DESCRIPTION OF THE INVENTION

Figure 1:
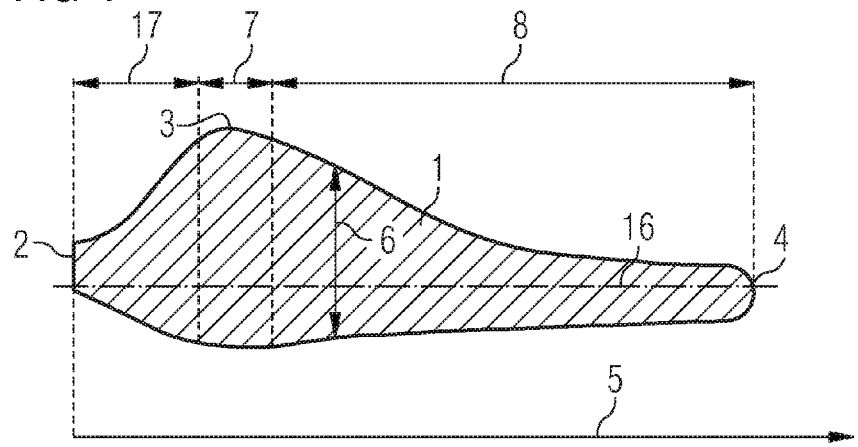
FIG. 1 schematically shows a wind turbine rotor blade.

FIG. 1 schematically shows a wind turbine rotor blade (1). Characteristic geometrical features of such a turbine blade are the root (2), the shoulder (3) and the tip point (4). The general layout can be described by the radius (5) and the chord (6) at each radial position along the centreline (16). Further, typical features are the maximum chord interval (7), the outer blade interval (8), and the root interval (17).

Figure 2:
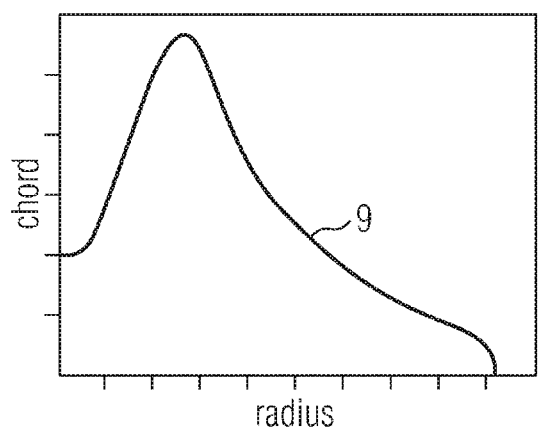
FIG. 2 shows an annual energy production optimised chord distribution.

FIG. 2 shows, for comparison reasons, a state of the art annual energy production optimised chord distribution as a function of the radius. The chord distribution is concave from the shoulder towards the tip point. The root interval (17) does not contribute notably to the annual energy production, and is merely a structural carrier of loads between the annual energy producing part of the blade and the blade root.

Figure 3:
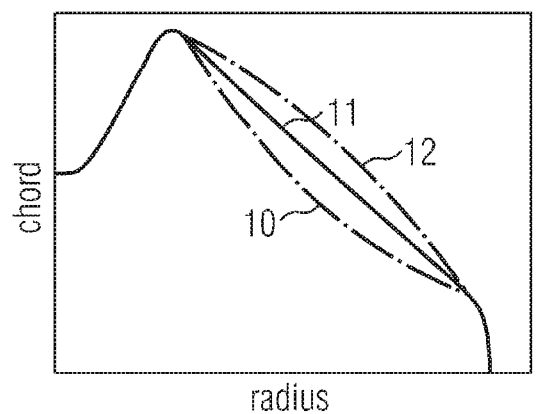
FIG. 3 shows common chord distributions.

For the mentioned practical reasons an annual energy production optimised chord distribution is normally not applied directly so that state of the art chord distributions do not reach an optimum annual energy production. Three examples for common state of the art chord distributions are shown in FIG. 3. The dashed outer chord distribution (10) is a simple downscaling of an annual energy production optimised layout, with moderately reduced output. The full line (11) and the dash-dot line (12) outer chord distributions have been modified by e.g. manufacturing or structural considerations.

The present invention provides an improved chord distribution for a wind turbine blade, taking into account the annual energy production, on the one hand, and the operational loads, the blade manufacturing process, the choice of materials, and secondary issues such as transport considerations on the other hand.

Figure 4:
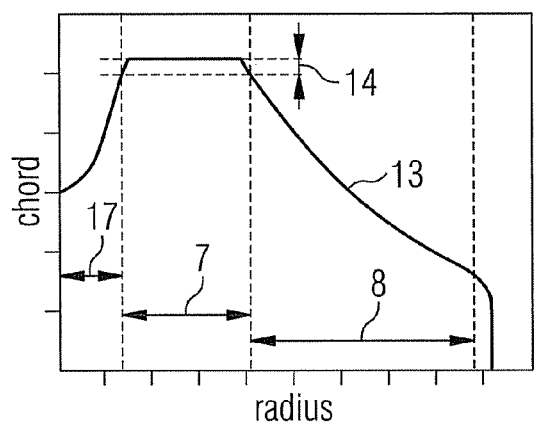
FIG. 4 shows an inventive chord distribution.

The inventive chord distribution (13), which is shown in FIG. 4, is characterised by a broad maximum chord interval (7) which gives the shoulder a somehow cut view compared to the pointed shape of the shoulder in the state of the art. The shape of the outer blade interval (8) resembles the shape of this interval in the state of the art.

By abandoning the pointed shape of the shoulder, it becomes possible to reduce the load acting on the blade, in particular in the maximum chord interval since the pointed shape would be a structural weakness. Moreover, by broadening the maximum chord interval as compared to the state of the art, a downscaling of the optimum chord distribution in the outer blade interval can be avoided so that this part of the blade can reach optimum annual energy production. Avoiding downscaling can be achieved by the fact that the maximum chord interval can be expanded to such a radial extension of the blade that its line defining the chord length in this interval as optimised with respect to the ratio of the annual energy production to the loads intersects the line defining the chord length in the outer blade interval as optimised with respect to annual energy production. The intersection point would then give the radial outer delimitation of the maximum chord interval. Hence, there are two parameters which can be varied, namely the maximum chord in the maximum chord interval which influences in particular the load acting on the blade, and the radial outer delimitation of the maximum chord interval which influences in particular the annual energy production of the blade.

Figure 5:
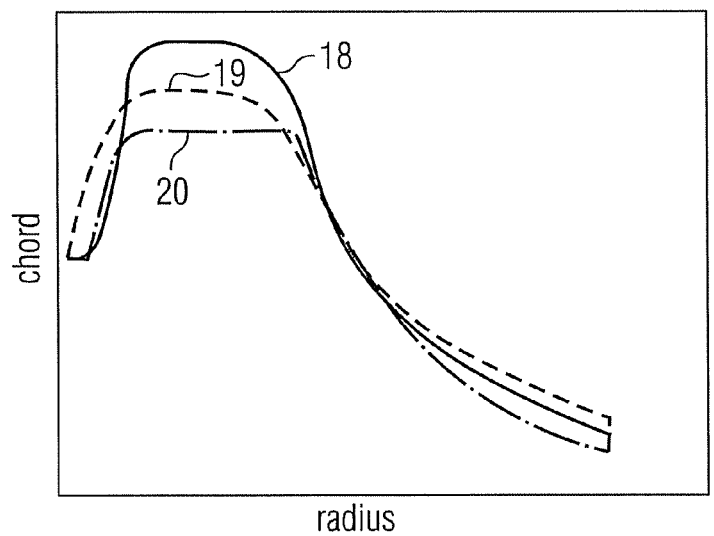
FIG. 5 shows further examples for inventive chord distributions.

FIG. 5 shows three different inventive chord distributions. The full line (18) represents a chord distribution with a relatively small maximum chord interval and a rounded shoulder. In contrast, the dash-dot line (20) shows a chord distribution with a broad maximum chord interval bounded by relatively sharp edges. The dashed line (19) is an intermediate variation of the described chord distributions (18) and (29).

Figure 6:
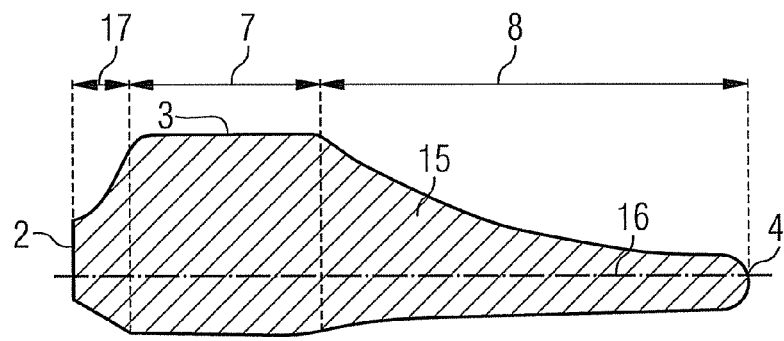
FIG. 6 schematically shows an inventive wind turbine rotor blade.

FIG. 6 schematically shows a correspondent inventive wind turbine rotor blade (15). One can see in FIG. 6 the broad maximum chord interval (7) over which the blade chord is no less than 95% of the shoulder chord (see reference numeral (14) in FIG. 4), with a size of for instance 20% of the entire blade length. Moreover, the outer blade interval (8) is shown which has an annual energy production optimising concave hyperbolic chord distribution from the shoulder towards the tip point and extends over for instance for 70% of the entire blade length.

Compared to the maximum chord interval of conventional wind turbine blades (see the examples in FIG. 3) the inventive turbine rotor blades have a flat shoulder (3) and an increased maximum chord interval (7) (see the examples in FIGS. 4 to 6). This layout optimises the ratio of the annual energy production of the blade to the loads acting on the blade. Because the loads are the main cost drivers and the annual energy production is the main desirable parameter, the inventive chord distribution describes an efficient layout.

The invention claimed is:

1. A wind turbine rotor blade, comprising:
   a root;
   a tip point;
   a shoulder;
   a maximum chord interval defined as a radial interval over which a blade chord is no less than 95% of a shoulder chord and extends over at least 15% of an entire blade length;
   a root interval that has a concave hyperbolic chord distribution and extends from the root to the maximum chord interval; and
   an outer blade interval that has a concave hyperbolic chord distribution and extends from the maximum chord interval to the tip point,
   wherein the maximum chord interval has a chord distribution that is constant except for a transition from the root interval to the maximum chord interval and except for a transition from the maximum chord interval to the outer blade interval.

2. The wind turbine rotor blade as claimed in claim 1, wherein the outer blade interval extends over at least 50% of the entire blade length.

3. The wind turbine rotor blade as claimed in claim 1, wherein the outer blade interval extends over not more than 80% of the entire blade length.

4. A method for optimising a chord distribution of a wind turbine rotor blade, comprising:
   defining the wind turbine rotor blade by a tip point, a shoulder, a maximum chord interval;
   defining the maximum chord interval as a radial interval over which the blade chord is no less than 95% of a shoulder chord;
   extending an outer blade interval from the maximum chord interval to the tip point;
   optimising the chord distribution in the maximum chord interval by maximising a ratio of an annual energy production to loads acting on the blade; and
   optimising the chord distribution in the outer blade interval differently from optimising the chord distribution in the maximum chord interval by the annual energy production alone.

5. The method as claimed in claim 4, wherein the maximum chord interval extends over at least 15% of an entire blade length.

6. The method as claimed in claim 4, wherein the outer blade interval extends over at least 50% of an entire blade length.

7. The method as claimed in claim 4, wherein the outer blade interval extends over not more than 80% of an entire blade length.

* * * * *